No. 67,353.
PATENTED JULY 30, 1867.
P. W. ROBINSON.
DOUGH KNEADER.
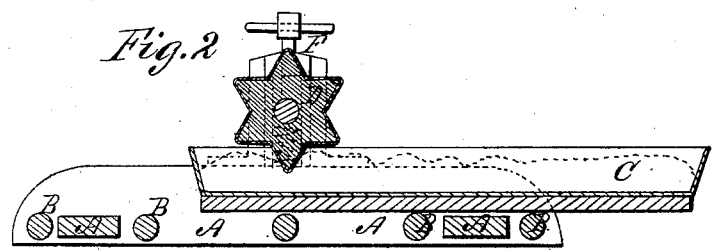
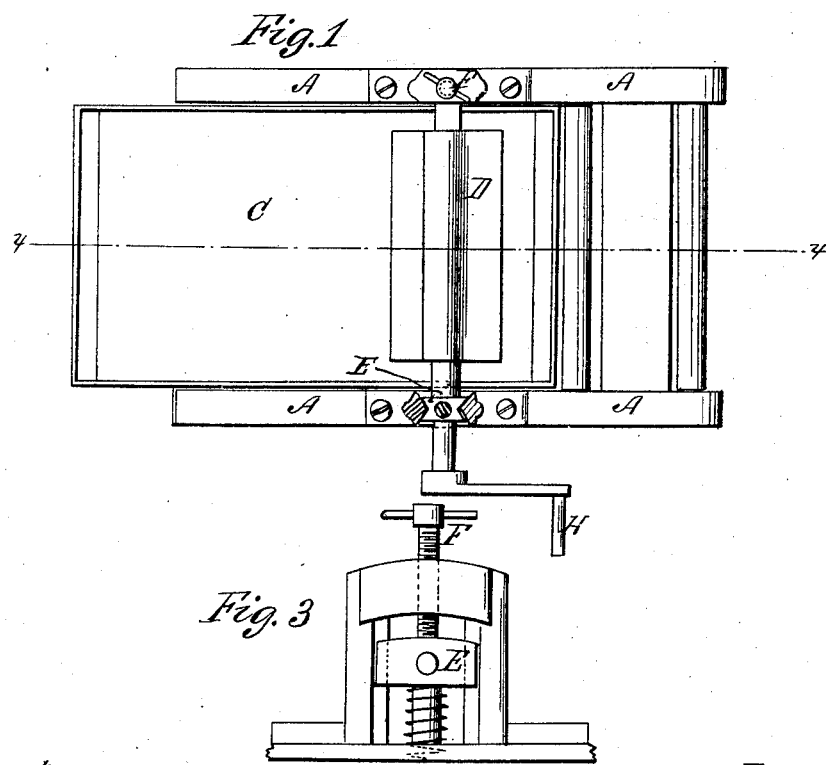
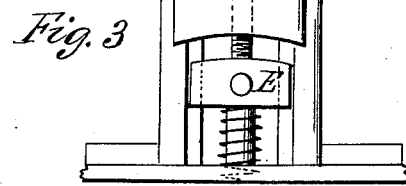
Witnesses:
Theo Tysche
J. A. Service
Inventor:
P. W. Robinson
Per [signature]
Attorneys

United States Patent Office.

PRINCE W. ROBINSON, OF NEW BEDFORD, MASSACHUSETTS.

Letters Patent No. 67,353, dated July 30, 1867.

IMPROVED DOUGH-KNEADER.

The Schedule referred to in these Letters Patent and making part of the same.

TO ALL WHOM IT MAY CONCERN:

Be it known that I, PRINCE W. ROBINSON, of New Bedford, Bristol county, Massachusetts, have invented a new and improved Dough and Butter-Kneader; and I do hereby declare that the following is a full, clear, and exact description thereof, which will enable others skilled in the art to make and use the same, reference being had to the accompanying drawings, forming part of this specification.

This invention relates to an improved dough and butter-kneader, and consists of a tray running on rollers in a frame, and of a corrugated roller adjustable in bearings on said frame operated by a crank. In the accompanying drawings—

Figure 1 is a top view of my improved kneader, and

Figure 2 is a section thereof on line $x\ x$.

Figure 3 is a side view of the adjustable bearings for the corrugated roller.

Similar letters of reference indicate corresponding parts.

A A is a framework, in which the rollers B B have their bearings, the tray C running upon them. D is a corrugated roller, borne adjustably in the sliding-block E, the screw F and spring G operating the block E. The roller D is operated by the crank-handle H, or in any other convenient manner.

For kneading dough the tray C is of tin, and the roller D covered with tin or other metal, to prevent the dough adhering to roller; for butter, both tray and roller should be of wood. The dough being placed in tray C, and roller E adjusted to required height, by turning the roller in one direction the tray will be moved on its rollers in the contrary direction, thoroughly kneading the dough, butter, or other substance required to be kneaded.

What I claim as new, and desire to secure by Letters Patent, is—

The combination of the frame A, rollers B, tray C, and adjustable corrugated roller D, substantially as described for the purpose specified.

PRINCE W. ROBINSON.

Witnesses:
HORATIO N. KIMBALL,
ROBT. C. PITMAN.